United States Patent [19]

Nelson

[11] 3,809,124
[45] May 7, 1974

[54] MIXING VALVE
[75] Inventor: Donald R. Nelson, Worcester, Mass.
[73] Assignee: Goddard Industries, Inc., Worcester, Mass.
[22] Filed: May 14, 1973
[21] Appl. No.: 360,381

[52] U.S. Cl............ 137/625.41, 251/251, 251/331, 251/163
[51] Int. Cl............................................. F16k 11/02
[58] Field of Search ...... 251/DIG. 2, 315, 163, 251, 251/331; 137/625.41, 625.46, 625.47, 625.4, 636.3

[56] References Cited
UNITED STATES PATENTS
3,512,547  5/1970  Gibbs et al.............. 137/625.4 X
3,519,017  7/1970  Nogier et al............. 137/625.4
3,747,641  7/1973  Hare et al............... 137/625.41
3,165,119  1/1965  Hewitt................... 251/331 X
3,515,169  6/1970  Berg et al............... 251/251

Primary Examiner—Henry T. Klinksiek

[57] ABSTRACT

The valve is of the type that includes a single operating handle for controlling both the proportioning between hot and cold water flow, and also the volume of flow. The valve includes a body having hot and cold inlet passages and an outlet duct, a ball-shaped control member, a rigid stationary plastic liner into which the control member fits, and a resilient diaphragm that is stationary but deflectable and is disposed intermediate the liner and valve seat cavity of the body. The liner has a pair of apertures for accommodating a corresponding pair of nipples which are displaceable toward and away from the inlet passages for controlling the flow of fluid therefrom.

11 Claims, 4 Drawing Figures ing nipples overlying the inlet ports of the body. The spherical liner fits within the diaphragm and is sealed to the diaphragm at its periphery. This liner is provided with a pair of apertures extending therethrough overlying the nipples of the diaphragm with each nipple extending through its corresponding aperture. The closure member normally holds the nipples of the diaphragm against the conical seat to cover and seal the inlet ports and prevents fluid flow through the valve. The closure member has a relieved valving surface so that upon movement of the closure member to an open position thereof fluid from at least one of the inlet ports flexes its associated nipple away from the seat and against the valving surface to thereby open the associated inlet port. The closure member preferably has a single handle extending therefrom for moving the closure member between opened and closed positions and for also moving the closure member to control the mixture of fluids from the two inlet ports.

The combination of a conical valve seat with a spherical diaphragm and liner provides a ready relief path when either or both of the inlet ports are opened.

MIXING VALVE

FIELD OF THE INVENTION

The present invention relates to an improved mixing or proportioning valve, and refers more particularly to a ball-type single, handle valve for mixing hot and cold water and for controlling the volume of flow through the valve.

BACKGROUND OF THE INVENTION

Typical prior art patents include U.S. Pat. Nos. 3,422,849; 2,592,062; 3,172,426; 3,519,018; and 3,056,418. One of these patents issued to Manoogian, U.S. Pat. No. 3,422,849, shows a mixing valve that employs a semi-spherical diaphragm. One of the drawbacks associated with this valve is that the ball is in direct contact with the entire inner surface of the diaphragm causing a wearing of the diaphragm thereby requiring possibly frequent replacement thereof. Also, this prior art arrangement is characterized by a high rotational torque which is caused by the ball tending to cling to the diaphragm as the ball is rotated. This makes it more difficult to rotate the ball control member and causes excess wear thereof.

Other known devices require resilient seats in the inlet passages. See for example U.S. Pat. No. 3,056,418. This requirement is not necessary, however, with the preferred structure of the present invention. Still another disadvantage of prior art devices is that the handle has to be restricted in its movement either linearly or rotationally. This requires further modification of the basic structure. However, with the present invention the handle need not be limited by a guide channel, for example, and the handle may be rotated without effecting the control of mixture or volume.

It is a primary object of the present invention to provide an improved mixing valve that obviates many of the problems inherent in prior art structures.

Another object of the present invention is to provide a mixing or proportioning valve that is structurally well-suited for manufacture with plastic parts thereby providing an inexpensive valve device.

A further object of the present invention is to provide a mixing valve having a single control handle and a deflectable diaphragm without the need for providing spring loaded seats in the valve body itself.

Another object of the present invention is to provide improved mixing or proportioning valve that has good sealing characteristics, that can be manufactured preferably using plastic parts and at a reasonable cost, that is easy to maintain, and that has a long cycle life. With the structure of the present invention it is also quite easy to replace the diaphragm when so required.

SUMMARY OF THE INVENTION

To accomplish the foregoing and other objects of this invention there is provided a mixing valve that is generally constructed comprising a body having a conical valve seat, a flexible diaphragm fitted in the seat, a relatively rigid spherical liner fitted in the diaghram, and a spherical closure member fitted within the liner. The body was preferably two inlet passages and an outlet duct disposed therein with the inlet passages terminated in two-spaced inlet ports in the conical seat. The diagphragm is sealed to the body at its periphery and is of a relatively uniform thickness having a pair of pro-

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
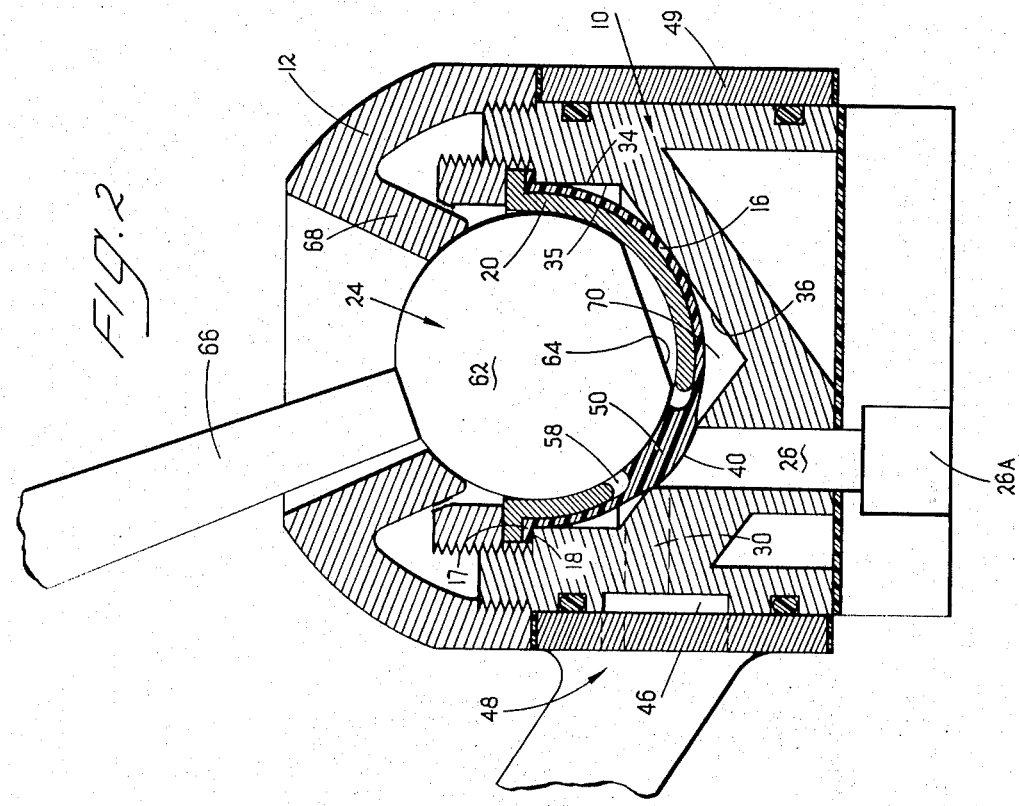
FIG. 1 is a cross-sectional view taken through a preferred embodiment of the mixing valve of this invention.
Figure 2:
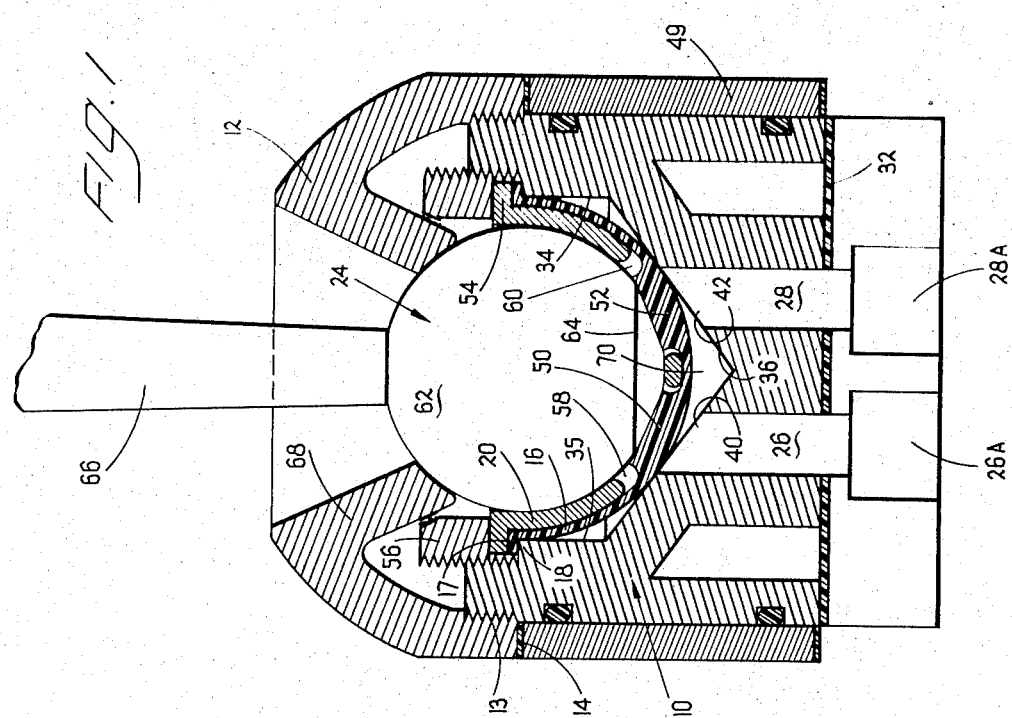
FIG. 2 is also a cross-sectional view taken orthogonally to the cross-sectional view of FIG. 1.

Referring now to the drawings and in particular FIGS. 1 and 2, there is shown a preferred embodiment of the mixing valve structure of the present invention. This mixing valve generally comprises a body 10, cap 12, diaphragm 16, liner 20, and spherical closure member 24. Most of the components shown in FIGS. 1 and 2 can be constructed of plastic. The diaphragm 16, however, is preferably made of a flexible synthetic rubber material.

The body 10 is of generally cylindrical shape and has inlet passages 26 and 28, and outlet duct 30 extending therethrough. Gasket 32 may close the bottom of the body 10.

The body 10 also has defined therein a valve seat 34 (see FIG. 3) defined by a vertical surface 35 and a slanted surface 36 which define a substantially conical valve seat. The inlet passages 26 and 28 extend to the conical seat and define respective inlet ports 40 and 42.

Figure 3:
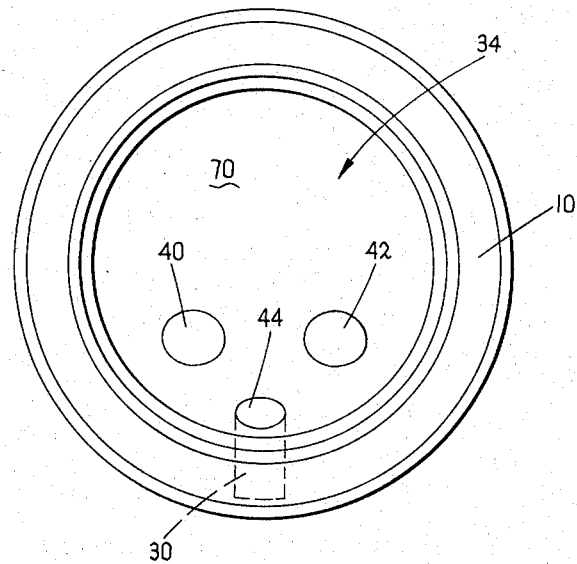
FIG. 3 is a plan view of the body of the mixing valve shown in FIG. 1 showing in particular the inlet passages and outlet duct.

FIG. 3 shows a plan view of the body shown in FIG. 1 and clearly depicts the two inlet ports 40 and 42. FIG. 3 also shows in dotted the outlet duct 30 which defines an outlet opening 44 to which fluid is directed when either or both of the inlet ports are opened.

As depicted in FIG. 2 the outlet duct 30 couples to a semi-annular channel 46 in the outer periphery of body 10. A faucet assembly 48 which may include a typical discharge member, also includes annular member 49 which, together with body 10 define the channel 46. Any fluids that are ported to outlet duct 30 pass from channel 46 out through the spout (not shown) of the faucet assembly 48. The faucet assembly 48 is usually permitted limited rotational movement relative to the body 10.

It is noted in particular in FIG. 1 that the inlet passages 26 and 28 are not provided with any resilient seats or associated spring biasing means as taught in the prior art. However, seating arrangements of that type can be used with the embodiment shown in FIG. 1 is so desired. The passages 26 and 28 both would couple at that bottom ends 26A and 28A to respective cold and hot water pipes. Suitable interconnecting means may be provided as is known in the art.

The semi-spherical diaphragm fits within seat 34 and has a peripheral flange 17 that rests upon shoulder 18 of the body. The diaphragm 16 is of substantially the same thickness throughout with the exception of nipples 50 and 52 which are deflectable by means of the closure member 24 to cover and uncover their associated ports 40 and 42, respectively.

In accordance with the present invention and in order to prevent excessive wear of the diaphragm 16 there is provided a liner 20 which is preferably of a hard plastic material and which is also of semi-spherical shape. The liner 20 includes a top flange 54 that rests upon flange 17 of the diaphragm. In order to maintain both the liner and diaphragm fixed at their outer periphery a compression ring 56 is provided which threadedly mates with the body 10 and compresses the flanges 17 and 54 against the shoulder 18 of the body.

The liner 20 has two openings or apertures 58 and 60 which respectively receive nipples 50 and 52. The apertures 58 and 60 are slightly larger than the nipples 50 and 52.

The closure member 24 comprises ball 62 which is spherical in shape except for the relief provided by flat surface 64. A handle 66 is suitably secured, such as in the manner shown in FIG. 2, to the ball 62 for controlling the movement thereof. The operation of the closure member in association with the liner and diaphragm is discussed in more detail hereinafter.

The mixing valve of this invention is also provided with a cap 12 which is suitably threaded at 13 to the top end of body 10. A gasket 14 may be provided between the bottom end of cap 12 and the top surface of annular member 49. The cap 12 has a downwardly depending converting wall 68 which, when the cap 12 is threaded in place, has its end urged against ball 62. The walls 68 are provided for limiting the movement of handle 66.

Regarding the closed position of the mixing valve reference is made to FIG. 2 wherein the ball has been rotated counter-clockwise to its off position wherein the flat surface 64 of ball 62 is not in contact with the nipples of the diaphragm 16. Thus, the curved portion 62 urges against the nipple 50 as shown in FIG. 2, and the opposite surface of the diaphragm closes across inlet port 40 blocking any fluid communication therethrough to the outlet duct.

In order to open one or both of the ports 40 or 42 the ball 62 is rotated from the position shown in FIG. 2 to the position shown in FIG. 1 for example. In this position, the valving surface 64 permits both of the nipples 50 and 52, or at least parts thereof, to deflect away from their associated inlet ports 40 and 42, respectively. In the position shown in FIG. 1, equal amounts of hot and cold water are expelled through ports 40 and 42 into mixing area 70 which is formed by virtue of the conical seat in association with the spherical diaphragm. The fluid is forced from area 70 out the outlet duct 3 and from there to the faucet mechanism 48. FIG. 3 also shows the area 70 which may be considered as existing in the vicinity of the inlet ports 40 and 42 and the outlet opening 44.

Thus, the volume control is primarily provided by moving the handle 66, as viewed in FIG. 2, in an arcuate sweeping manner. In order to provide the mixture control the handle 66 is swept in a similar manner as viewed in FIG. 1. Thus, if the ball 62 is moved from the position shown in FIG. 1 and is rotated clockwise then the valving surface 64 contacts the nipple 50 and the corresponding nipple 52 is forced outwardly by the surface of ball 62 so as to close port 42. The surface 64 adjacent to nipple 50, however, permits the diaphragm in that vicinity to deflect towards valving surface 64 and the port 40 is opened. By rotating the handle 66 in an arcuate manner between the two limiting positions as defined by wall 68 different ratios of mixtures of fluids from the passages 26 and 28 can be obtained. It is noted in both FIGS. 1 and 2 that the flat surface 64 is arranged directly opposite to handle 66. This arrangement permits rotation of ball 62 without effecting the volume or mixture control.

FIGS. 1–3 show one arrangement for the placement of and configuration of output port 30. In an alternate arrangement and to insure that there is adequate relief from area 70 to the output port, the outlet opening 44 may be somewhat elongated or eliptical extending, in view of FIG. 3, toward the center of valve seat 34. By providing this type of outlet opening 44 the port 30, specifically shown in dotted in FIG. 2, would be wider than depicted in FIG. 2. With this arrangement, when the ball valve is moved to its open position, such as the position shown in FIG. 1, the water or other fluid readily passes from area 70 through the output port 30 to faucet assembly 48.

Figure 4:
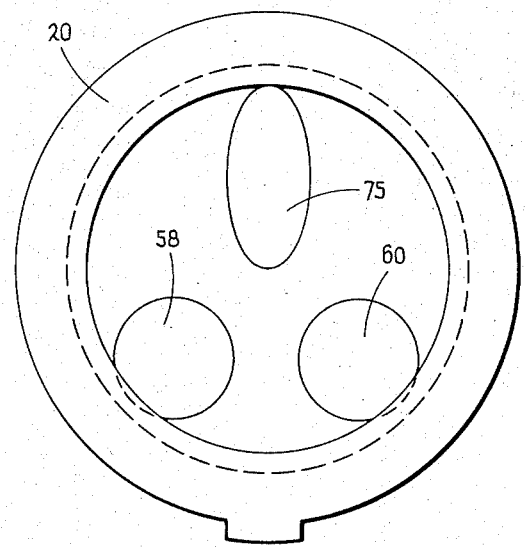
FIG. 4 shows an alternate arrangement for the liner.

FIG. 4 shows an alternate arrangement for relieving area 70. In this arrangement, rather than providing an enlarged elongated output port, there is provided in liner 20 a relief slot 75. FIG. 4 also shows the apertures 58 and 60 which may be of the same configuration as shown in FIGS. 1 and 2. However, in an alternate embodiment these apertures 58 and 60 may also have an eliptical shape or one of various other shapes rather than the one shown in FIGS. 1 and 2. By providing this aperture that extends more in a vertical direction up along the surface of the liner, there is provided an increased volume flow to the output port at any given position of the ball.

Regarding FIG. 4, the relief slot 75 is preferably as shown in

FIG. 4 having an elongated substantially eliptical shape. When the ball is rotated to an open position the portion of the rubber diaphragm overlying the slot 75 deflects into the slot 75 permitting a relief for the fluids in area 70. This relief slot 75 is useful for relieving the fluids from area 70 primarily only when the ball is in a position of partial volume flow wherein ports in the body are only partially covered. In the full open position of the valve for one input port the nipple essentially totally deflects away from the input port in the body allowing full flow from the input port directly to the output port. When the ball valve is metering equal amounts from each of the input ports and is in its full on position the relief slot 75 also provides some additional relief from area 70.

Having described one embodiment for the mixing valve of this invention it should now become apparent that numerous other embodiments and modification thereof should fall within the scope of the present invention. For example, in the illustrated embodiment the nipples are shown on the inside of the diaphragm. In an alternate embodiment these nipples could be shown extending from the outside surface of the diaphragm or they could be provided on opposite inside and outside surfaces. Also, for example, the ball has been shown with a flat surface on it. Obviously, other valve relief surfaces could be provided other than a flat surface. The present invention should be limited solely by the appended claims.

What is claimed is:

1. A mixing valve comprising;
a body having two inlet passages, an outlet duct and a valve cavity including a valve seat disposed therein with the inlet passages terminating in two spaced inlet ports in the seat,
a generally spherical flexible diaphragm fitted in said seat,
said diaphragm having a pair of protruding nipples overlying said inlet ports,
a spherical liner fitted in said diaphragm,
said liner having a pair of apertures therethrough overlying said nipples with each said nipple extending through said aperture,
a closure member fitted within said liner so as to normally hold the nipples of said diaphragm against said seat to cover and seal said inlet ports and prevent fluid flow through said valve,
said closure member having a valving surface so that upon movement of said closure member to an open position thereof fluid from at least one of said inlet ports flexes at least one of the nipples of said diaphragm away from said seat and against said valving surface to open such inlet port,
and means for moving said closure member between open and closed positions and for moving said closure member to control the mixture of the fluids from the two inlet ports.

2. The valve of claim 1 wherein said diaphragm and liner are both of relatively uniform thickness.

3. The valve of claim 2 comprising means for sealing said diaphragm and liner at their periphery to said body.

4. The valve of claim 3 wherein said valving surface is flat.

5. The valve of claim 4 including a cap having means for limiting the movement of a handle fixed to said closure member.

6. The valve of claim 1 wherein said valving surface is opposite said handle.

7. The valve of claim 6 wherein said valve cavity has a cylindrical portion above the conical seat.

8. The valve of claim 7 wherein said sealing means includes a threaded ring.

9. The valve of claim 1 wherein said liner has a relief aperture.

10. The valve of claim 9 wherein said relieving aperture has an elongated shape and is disposed on one side of said line, said pair of apertures being disposed on the other side of said liner.

11. The valve of claim 6 wherein said valving surface includes a flat surface and said handle is elongated, said handle being disposed orthogonally to said flat surface.

* * * * *